Patented Nov. 5, 1929

1,734,197

UNITED STATES PATENT OFFICE

HENRY BLUMENBERG, JR., OF LOS ANGELES, CALIFORNIA.

FILTERING MATERIAL

No Drawing.    Application filed December 15, 1927. Serial No. 240,212.

My invention relates to a composition of matter intended for use as a filtering material.

It is an object of this invention to provide a filtering material which has superior purifying, bleaching and germicidal properties. It is adapted for the purification, clarification and deodorizing of mineral oil distillates, such as gasoline, kerosene and lubricating oils, but may also be used for the purification of water, industrial waste liquors and sewerage.

My invention consists of the composition of matter hereinafter described and claimed.

I take copper sulphate $CuSO_4$ and calcium hypochlorite $Ca(OCl)_2$ and grind into a fineness of 20–100 screen mesh. The proportions of the two reagents are taken as indicated by their molecular weights.

To 100 pounds of the mixture of copper sulphate and calcium hypochlorite thus prepared I add from 10 to 30 pounds of inert cellular material, preferably ground to a fineness of about 20 screen mesh. Material suitable for this purpose is pumice, diatomaceous earth, charcoal, wood fibre, asbestos and the like. The mixture of copper sulphate, calcium hypochlorite and inert material is formed into a homogeneous mass.

The copper sulphate and calcium hypochlorite will not react in the dry state but only in the presence of water or when in contact with organic matter and will then form calcium sulphate, copper chloride, and chroline dioxide. It is the chlorine dioxide which is the powerful oxidizing agent clarifying and deodorizing the liquids to be treated, as well as destroying bacteria and germs.

One-half to five percent, by weight, of the filtering material thus prepared is usually sufficient for the clarification and deodorization of mineral oil distillates.

For the purification of water 25 pounds of the filtering material to one million gallons of the water is sufficient. It should be noted that the chlorine dioxide in contra-distinction to chlorine, which is sometimes used for water purification, leaves no disagreeable odor, the slight odor present resembling that of ozone.

In the treatment of industrial waste liquors and of sewerage from 100 to 500 pounds of the filtering material are usually required per one million gallons.

The liquids to be treated are usually passed through a layer of the filtering material under pressure or allowed to percolate by gravity.

In place of the copper sulphate, iron sulphate, either the ferrous or the ferric, cobalt sulphate, or nickel sulphate, may be used; the quantities taken being by weight in the proportion of one molecular weight of the sulphate to one molecular weight of the calcium hypochlorite. It should be noted that the sulphates mentioned are the soluble sulphates of the base metals of the eighth group of the periodic table of elements.

Various changes may be made by those skilled in the art without departing from the spirit of my invention as claimed.

I claim:

A filtering material for use as a purifying, deodorizing and oxidizing agent, containing copper sulphate, calcium hypochlorite, the proportions by weight being one molecule of copper sulphate to one molecule of calcium hypochlorite, and an inert cellular material.

In testimony whereof I have signed my name to this specification.

HENRY BLUMENBERG, JR.